United States Patent
Chai et al.

(10) Patent No.: US 11,328,206 B2
(45) Date of Patent: May 10, 2022

(54) SYSTEMS AND METHODS FOR OPTIMIZING OPERATIONS OF COMPUTING DEVICES USING DEEP NEURAL NETWORKS

(71) Applicant: SRI International, Menlo Park, CA (US)

(72) Inventors: Sek M. Chai, Princeton, NJ (US); David C. Zhang, Belle Mead, NJ (US); Mohamed R. Amer, Brooklyn, NY (US); Timothy J. Shields, Houston, TX (US); Aswin Nadamuni Raghavan, Princeton, NJ (US); Bhaskar Ramamurthy, Menlo Park, CA (US)

(73) Assignee: SRI International, Menlo Park, CA (US)

( * ) Notice: Subject to any disclaimer, the term of this patent is extended or adjusted under 35 U.S.C. 154(b) by 986 days.

(21) Appl. No.: 15/625,578

(22) Filed: Jun. 16, 2017

(65) Prior Publication Data

US 2017/0364792 A1    Dec. 21, 2017

Related U.S. Application Data

(60) Provisional application No. 62/351,205, filed on Jun. 16, 2016.

(51) Int. Cl.
*G06N 3/04*     (2006.01)
*G06N 3/063*    (2006.01)
(Continued)

(52) U.S. Cl.
CPC ............. *G06N 3/0454* (2013.01); *G06F 9/46* (2013.01); *G06N 3/0445* (2013.01); *G06N 3/063* (2013.01); *G06N 3/08* (2013.01); *G06F 9/50* (2013.01)

(58) Field of Classification Search
CPC ............ G06N 3/08; G06N 20/00; G06N 3/04; G06N 3/0454; G06N 3/063; G06N 7/005;
(Continued)

(56) References Cited

U.S. PATENT DOCUMENTS

2005/0197977 A1    9/2005   Buck et al.
2014/0067738 A1    3/2014   Kingsbury
(Continued)

FOREIGN PATENT DOCUMENTS

WO    2016/039751 A1    3/2016

OTHER PUBLICATIONS

Salakhutdinov et al., Deep Boltzmann Machines (2009) (Year: 2009).*

(Continued)

*Primary Examiner* — Ann J Lo
*Assistant Examiner* — Charles C Kuo
(74) *Attorney, Agent, or Firm* — Moser Taboada

(57) ABSTRACT

Operations of computing devices are managed using one or more deep neural networks (DNNs), which may receive, as DNN inputs, data from sensors, instructions executed by processors, and/or outputs of other DNNs. One or more DNNs, which may be generative, can be applied to the DNN inputs to generate DNN outputs based on relationships between DNN inputs. The DNNs may include DNN parameters learned using one or more computing workloads. The DNN outputs may be, for example, control signals for managing operations of computing devices, predictions for use in generating control signals, warnings indicating an acceptable state is predicted, and/or inputs to one or more neural networks. The signals enhance performance, efficiency, and/or security of one or more of the computing devices. DNNs can be dynamically trained to personalize operations by updating DNN weights or other parameters.

27 Claims, 8 Drawing Sheets

(51) Int. Cl.
*G06N 3/08* (2006.01)
*G06F 9/46* (2006.01)
*G06F 9/50* (2006.01)

(58) Field of Classification Search
CPC ............ G06N 5/04; G06N 3/084; G06N 3/02;
G06N 3/0472; G06N 20/20; G06N
3/0445; G06N 3/0481; G06N 3/088;
G06N 5/022; G06N 5/025; G06N 10/00;
G06N 20/10; G06N 3/0427; G06N 3/06;
G06N 3/0635; G06N 3/067; G06N 3/10;
G06N 5/003; G06N 5/027; G06N 5/045;
G06N 5/046; G06N 7/00; G06N 3/006;
G06N 3/004

See application file for complete search history.

(56) References Cited

U.S. PATENT DOCUMENTS

2014/0149772 A1   5/2014   Arora et al.
2015/0178637 A1*  6/2015   Bogojeska ............... G06N 5/04
                                                706/12
2016/0078863 A1   3/2016   Chung et al.
2016/0103599 A1   4/2016   Tang et al.

OTHER PUBLICATIONS

Hughes et al., Accelerating Multi-core Processor Design Space Evaluation Using Automatic Multi-thread Workload Synthesis (2008) (Year: 2008).*

Chedid et al., Survey on Power Management Techniques for Energy Efficient Computer Systems (2002) (Year: 2002).*

Sheikh et al., An overview and classification of thermal-aware scheduling techniques for multi-core processing systems (2011) (Year: 2011).*

International Search Report for International Patent Application No. PCT/US2017/037945, dated Sep. 6, 2017, 2 pages.

The International Bureau of WIPO, "International Preliminary Report on Patentability" in application No. PCT/US2017/037945, dated Dec. 18, 2018, 12 pages.

Current Claims in application No. PCT/US2017/037945, dated Dec. 2018, 7 pages.

* cited by examiner

SYSTEMS AND METHODS FOR OPTIMIZING OPERATIONS OF COMPUTING DEVICES USING DEEP NEURAL NETWORKS

CROSS REFERENCE TO RELATED APPLICATIONS

This application claims the benefit of U.S. Provisional Patent Application Ser. No. 62/351,205 filed on Jun. 16, 2016, and entitled "GPU Activity Prediction Using Representation Learning." The disclosure of the provisional patent application and the references cited therein are hereby incorporated by reference.

STATEMENT REGARDING FEDERALLY SPONSORED RESEARCH

This invention was made with government support under contract FA9453-15-C-0056 awarded by the United States Air Force, and grant number 1526399 awarded by the National Science Foundation. The government has certain rights in the invention.

FIELD OF THE INVENTION

This invention relates generally to computer processing systems, and more particularly, to the use of one or more deep neural networks to control and/or inform computer microarchitecture or otherwise manage computing operations. Deep neural networks, with generative properties, may be used to learn computing operations and/or processor activity, and generate outputs as, for example, control signals, predictions, warning signals, etc., to enhance performance, efficiency, and security of one or more computing devices/processing units.

BACKGROUND

Microprocessor operations are dependent on program instructions and data. It may also be dependent on other control elements such as temperature, battery levels, and memory resources (e.g., cache). In order to improve processor performance, there is a need to anticipate microprocessor operation, ahead of the actual microprocessor event. This is essentially the notion of control circuitry in microprocessor elements today, e.g. branch prediction, cache prefetch, etc. Use of software to evaluate and predict microprocessor conditions—for example, by running software on the same microprocessor to compute and predict processor state, as well as process input data (e.g., the workload)—is slow and computationally and power expensive. To improve performance, one can utilize additional processor cores, but that may be less power efficient.

Current standard practice in computer architecture design includes a set of rules and methods that describe the functionality, organization, and implementation of a computer processing system. The rules and methods used in control of the processing system are "tuned" based on benchmarks (e.g., SPECINT) that are representative of computing workloads (i.e., tasks and functions in which the processing system is engaged) in the field. Performance profiles are obtained through a series of experiments and used to select the design of a specific microarchitecture component. For example, branch prediction circuitry and operations are determined based on workload profiles of specific benchmarks. The performance of a computing system relies on sustained operational throughput. Sustained operation is becoming harder to achieve as computation workloads become more complex. With the end of Dennard scaling, and the increasing abundance of Big Data, it is imperative to minimize wasted computing effort in order to enhance reliability and scalability. Further, traditional approaches use heuristic algorithms designed for specific processor operation. To achieve higher performance, there is a need for more holistic analysis of larger portions of microprocessors, since, as indicated above, microprocessor operations depends on a variety of elements.

SUMMARY

In one or more embodiments, a computer-implemented method for managing operations of one or more computing devices having one or more processing units involves receiving, as inputs to a first set of one or more deep neural networks (DNNs), computing environment data, which may be, for example, sensor data corresponding with operation of one or more of the computing devices, processing data corresponding with a set of one or more instructions received at one or more of the processing units for execution by the one or more processing units, and/or DNN data corresponding with DNN outputs generated by one or more DNNs involved in managing operations of the one or more computing devices. One or more DNNs may be applied to the first set of inputs to generate a first set of one or more DNN outputs based on one or more relationships between the received inputs. The one or more DNNs may include DNN parameters learned using one or more computing workloads. The first set of DNN outputs, generated by application of the one or more DNNs, may be provided as one or more signals. The signals may be, for example, control signals for managing one or more operations of one or more of the computing devices, predictions for use in generating control signals for managing one or more operations of the computing devices, the predictions corresponding to a future state of one or more of the computing devices, warnings indicating that a predicted future state of one or more components of the one or more computing devices deviates more than a threshold deviation level from an acceptable state, a second set of one or more inputs to the first set of DNNs and/or to a second set of one or more DNNs involved in managing operations of the one or more computing devices for generation of a second set of one or more DNN outputs, and/or a set of design guidelines for creating a processor to function within specified parameters. The signals provided to the one or more computing devices enhance performance, efficiency, and/or security of one or more of the computing devices.

In certain implementations, the one or more of the DNNs may be generative DNNs.

In certain implementations, one or more of the DNNs in the first set of DNNs is implemented within a tool for creating an optimal processor design.

In certain implementations, the first set of DNN outputs includes predictions of a future state of one or more of the processing units of the computing devices.

In certain implementations, a new processor design within a design environment is created by utilizing the predictions of a future state.

In certain implementations, the first set of DNN outputs includes control signals for managing operations of one or more datapaths of the processing units.

In certain implementations, the first set of DNN outputs includes one or more control signals for, and/or one or more predictions used for generating one or more control signals for, adjusting a current or voltage supplied to one or more of the processing units.

In certain implementations, the first set of DNN outputs includes one or more signals for, and/or one or more predictions used for generating one or more control signals for, shutting down one or more components of the computing devices.

In certain implementations, one or more of the DNNs in the first set of DNNs is trained using contrastive divergence (CD). The CD training process may include learning DNN parameters via at least one bottom-up pass and at least one top-down pass, which may follow the bottom-up pass. In the bottom-up pass, all hidden nodes of a hidden layer of the DNN may be sampled in parallel, and in the top-down pass, all visible nodes may be sampled in parallel.

In certain implementations, the DNN parameters are a first set of DNN parameters, and the method further involves receiving a second set of one or more DNN parameters to be applied to received inputs. In certain configurations, the second set of DNN parameters may be based on the first set of DNN outputs.

In certain implementations, one or more of the DNNs in the first set of DNNs is implemented using circuitry in one or more of the processing units.

In certain implementations, the one or more DNNs are applied using a first processing unit, and the one or more signals include control signals for a second processing unit.

In certain implementations, the one or more DNNs are applied using a first core of a processing unit, and the at least one signal includes at least one control signal for a second core of the processing unit.

In certain implementations, received inputs include information on network traffic.

In certain implementations, received inputs include information on a temperature of one or more of the processing units.

In one or more embodiments, a system for optimizing processing operations of one or more computing devices includes a first computing device having a first processing unit, and a first deep neural network (DNN) that may receive one or more DNN inputs. The DNN inputs may include sensor data corresponding with operation of the first computing device and/or a second computing device with which the first computing device is communicatively coupled. The DNN inputs may also include processing data corresponding with one or more instructions received at the first processing unit and/or a second processing unit of the second computing device. The DNN inputs may moreover include DNN data corresponding with one or more outputs from the first DNN and/or a second DNN. One or more DNN outputs may be based on one or more relationships between inputs received by the first DNN. The system may be configured to optimize, based on the DNN outputs, one or more operations of the first processing unit and/or the second processing unit by enhancing performance, efficiency, and/or security of one or more of the computing devices.

In certain implementations, the DNN outputs provided by the first DNN are based on one or more predictions corresponding to a future state of the first processing unit and/or the second processing unit.

In certain implementations, the DNN outputs include one or more control signals for controlling operation of one or more datapaths of the first processing unit and/or the second processing unit.

In certain implementations, the DNN outputs include one or more predictions related to one or both of the first and second processing units. The system may adjust a current or voltage supplied to one or both of the first and second processing units based on the one or more predictions.

In certain implementations, the DNN outputs include one or more predictions related to one or both of the first and second processing units. The system may provide a warning signal to one or both of the first and second computing devices if one or more unexpected branches, faults, or exceptions in one or both of the first and second processing units is predicted.

In certain implementations, one or both of the first and second DNNs is trained using contrastive divergence (CD), in which DNN parameters are learned via at least one bottom-up pass that may be followed by at least one top-down pass. In the bottom-up pass, all hidden nodes of the hidden layer of the DNN may be sampled in parallel. In the top-down pass, all visible nodes may be sampled in parallel.

In certain implementations, one or both of the first and second DNNs uses a first set of DNN parameters. The system may feed a second set of DNN parameters to one or both of the first and second DNNs. The second set of DNN parameters may be based on the DNN outputs in certain configurations.

In certain implementations, one or both of the first and second DNNs is a generative DNN.

In certain implementations, one or both of the DNNs is implemented using circuitry in one or both of the first and second processing units, respectively.

In certain implementations, the processing unit is a graphics processing unit (GPU), a field-programmable gate array (FPGA), or a digital signal processor (DSP).

In certain implementations, the DNN is a recurrent neural network or a restricted Boltzmann machine.

In one or more embodiments, a non-transitory computer-readable medium tangibly comprising computer program instructions, which, when executed by a processor, causes the processor to receive one or more inputs corresponding to an operation of one or more computing devices. One or more deep neural networks (DNNs) may be applied to the one or more inputs to generate one or more DNN outputs based on one or more relationships between inputs received. The DNN may include learned DNN parameters corresponding to processor behavior under one or more computing workloads. The one or more DNN outputs may be signals such as control signals for managing one or more operations of one or more of the computing devices, predictions for use in generating control signals for managing one or more operations of the computing devices, the predictions corresponding to a future state of one or more of the computing devices, warnings indicating that a predicted future state of one or more components of the one or more computing devices deviates more than a threshold deviation level from an acceptable state, and/or inputs to one or more DNNs involved in managing operations of the one or more computing devices. The signals are able to enhance performance, efficiency, and/or security of one or more of the computing devices.

In one or more embodiments, a computer-implemented method for managing processing operations of one or more computing devices having one or more processing units comprises providing, as inputs to a first set of one or more deep neural networks (DNNs), computing environment data. The computing environment data may include sensor data corresponding with operation of one or more of the computing devices, processing data corresponding with a set of one or more instructions received at one or more of the processing units for execution by the one or more processing units, and/or DNN data corresponding with DNN outputs from the first set of DNNs and/or a second set of one or more DNNs. A set of one or more DNN outputs, which may be based on one or more relationships between inputs provided to the first set of DNNs, may be received from the first set of DNNs. Operations of one or more of the processing units may be optimized based on the first set of DNN outputs from the first set of DNNs, whereby outputs that affect processor operations using the first set of DNNs enhances performance, efficiency, and/or security of one or more of the computing devices.

In one or more embodiments, a processor having one or more cores is disclosed, the processor comprising a processing datapath having one or more functional units configured to perform computations to execute instructions received by the processor. The processor includes a control unit for managing the processing datapath as instructions are executed, and the control unit includes a deep neural network (DNN) having a hidden layer. The DNN is trained to learn DNN parameters corresponding to processor behavior under one or more computing workloads, wherein the DNN is configured to receive, as inputs, data related to processor operation as instructions are executed, and provide, as outputs, control signals that command the datapath based on the learned DNN parameters.

The DNN may be a generative DNN configured to output predictions regarding processor states to an application, and the application may be partly or wholly external to the processor. The application can be, for example, a power management system that is configured to set a voltage or current level in the datapath based on one or more predictions from the DNN. In certain implementations, the application can be anomaly detector configured to output a warning signal based on one or more predictions that one or more unexpected branches, faults, and/or exceptions are indicative of malware being executed using the processor. In one or more configurations, the application is a training module configured to feed revised parameters to the DNN based on one or more predictions.

The data received as inputs to the control unit may include one or more instructions to be executed by the processor. Additionally or alternatively, the data received as inputs to the control unit may include sensor data providing information on, for example, network traffic or processor temperature. In certain configurations, the datapath is pipelined, and control signals from the DNN are based at least in part on branch prediction.

In certain embodiments, the datapath is part of a first core of the processor, and the datapath in the first core receives control signals via a DNN in a second core of the processor.

The DNN may be trained using, for example, contrastive divergence (CD). The parameters learned by the DNN may be learned via at least one bottom-up pass and at least one top-down pass, which in certain configurations follows the bottom-up pass. In the bottom-up pass, a subset or all hidden nodes of the hidden layer of the DNN may be sampled in parallel, and in the top-down pass, a subset or all visible nodes of the DNN may be sampled in parallel.

In various embodiments, the processor may be a graphics processing unit (GPU), a digital signal processor (DSP), or a central processing unit (CPU) used in one or more computing systems for one or more users. The DNN may be, for example, a recurrent neural network, a recursive neural networks, a restricted Boltzmann machine, etc.

In one or more embodiments, a method of using a deep neural network (DNN) to optimize processing operations of one or more computing devices, such as by outputting control signals or other outputs for use in control of a processor having a datapath with one or more functional units configured to perform computations to execute instructions received by the processor, are disclosed. The DNN may be trained to learn parameters corresponding to processor behavior under one or more computing workloads, and the DNN may in certain configurations be incorporated in a control unit of the processor, the control unit configured to manage the datapath. The DNN may be configured to receive, as inputs, data related to processor operation as instructions are being executed by the processor, and provide, as outputs, control signals that command the datapath based on learned parameters.

The DNN may be, in one or more implementations, a generative DNN configured to output predictions regarding processor states. Using predictions related to processor operation, a voltage or current level in the datapath may be set. Additionally or alternatively, a warning may be issued based on a prediction that one or more unexpected branches, faults, and/or exceptions are indicative of malware being executed using the processor.

In various configurations, a DNN may be implemented using one or more cores of one or more processing units to generate outputs that can be used in optimizing operations of one or more other cores of the same or one or more other processing units. For example, a datapath may be part of a first core of the processor, the control unit (which may implement one or more DNNs, in certain configurations) may be part of a second core of the processor, and the datapath of the first core may be optimized using outputs (which may be control signals, predictions, etc.) from the control unit of the second core.

In one or more embodiments, training the DNN may involve learning parameters via at least one bottom-up pass and at least one top-down pass. The at least one bottom-up pass may involve using one or more sampling equations to sample, in parallel, a subset or all hidden nodes of the hidden layer of the DNN. The at least one top-down pass, which may follow the bottom-up pass, may involve using one or more sampling equations to sample, in parallel, a subset or all visible nodes of the DNN.

In one or more embodiments, a processing system comprising a processor and an application module are disclosed. The processor may include a processing datapath having one or more functional units configured to perform computations to execute instructions received by the processor. The processor may also include a control unit for managing the processing datapath as instructions are executed. The control unit may include a generative deep neural network (DNN) having a hidden layer. The DNN may have been trained to learn DNN parameters corresponding to processor behavior under one or more computing workloads. In one or more configurations, the DNN may be configured to input data related to processor operation as instructions are executed, output control signals that command the datapath based on the learned DNN parameters, and/or output predictions regarding processor operation to the application module. The application module, which may be part of the processor or separate from the processor, may be configured to use one or more predictions received from the DNN to make a change to (1) the DNN, (2) the datapath, or (3) both the DNN and the datapath. The changes may be related to, for example, power management, cyber-security, and/or personalization of the DNN by providing revised (e.g., new or replacement) parameters to the DNN.

The disclosed approach can achieve enhanced management of computing operations by using DNNs, such as generative deep neural networks, with parameters that may have been learned under one or more computing workloads. Using sensor data, instruction sets received for execution, and/or the outputs of other neural networks (such as other generative DNNs), control signals, predictions, warnings, and/or inputs to other neural networks may be provided to help enhance the performance, efficiency, and/or security of one or more computing devices. The disclosed approach can also achieve more enhanced microprocessor design and improved microprocessor performance. In various implementations, the approach can be used in, for example, detection of malware based on anomalous processing behaviors, control of the power management system, ramping up and down of current and/or voltage, and lower-power operation. By allowing workload characteristics to be learned dynamically (e.g., by determining revised DNN parameters based on inputs to, or outputs from, one or more DNNs), the disclosed approach can allow for personalization of computing devices and/or microprocessor function by, for example, tuning control operations based on individual computing needs. Implementations of the disclosed systems and methods can provide an automated means for computing systems (robots, vehicles, etc.) to tune themselves by learning how to best adapt and remain resilient as computing workloads change over time.

Further advantages and features of the invention will be apparent from the remainder of this document, which discusses various exemplary implementations, in conjunction with the associated drawings.

Figure 1:
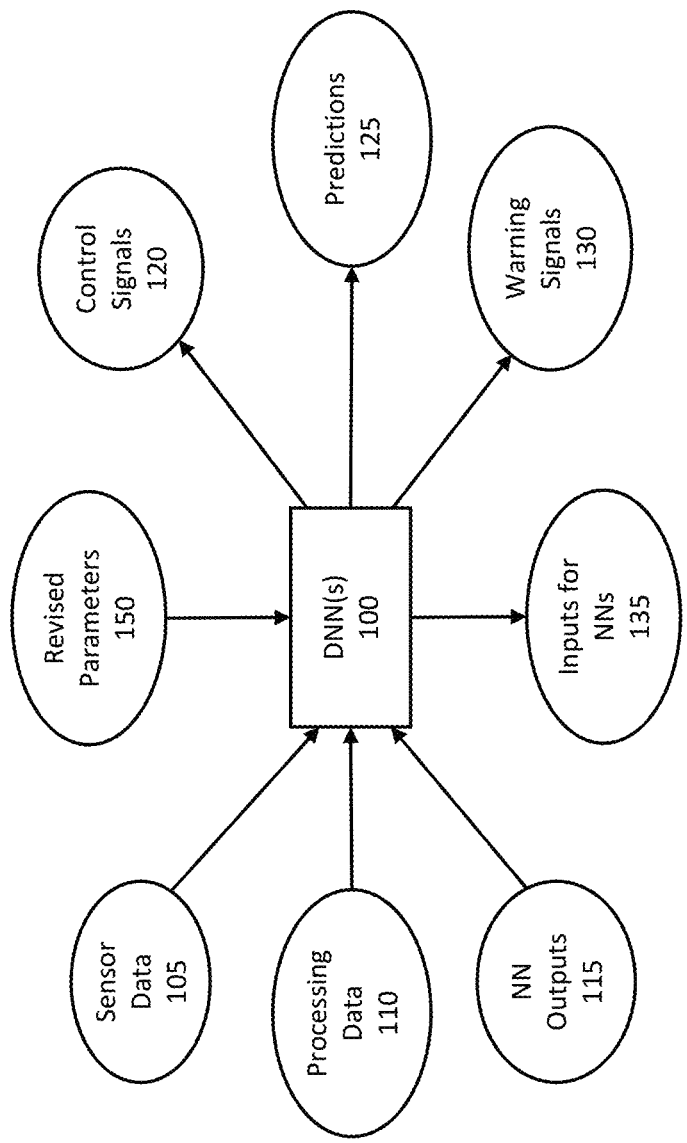
FIG. 1 depicts example data that may be input to, and output by, a set of one or more deep neural networks (DNNs), in accordance with one or more embodiments.

The foregoing and other aspects and advantages of the invention will appear from the following description. In the description, reference is made to the accompanying drawings that form a part hereof, and in which there is shown by way of illustration preferred versions of the invention. Such versions do not necessarily represent the full scope of the invention, however, and reference is made therefore to the claims and herein for interpreting the scope of the invention.

DETAILED DESCRIPTION

Disclosed are systems and methods for managing operations of one or more computing devices using one or more deep neural networks (DNNs). In one or more embodiments, inputs corresponding with data on the computing/operating environment of computing devices may be received, and one or more generative DNNs may be applied to the data to generate outputs that can be used to optimize or otherwise manage operations of the computing devices and/or their components. A generative model may be used to randomly generate deep learning values given hidden parameters.

In certain implementations, software operating in independent threads or processes can evaluate current processor performance and send signals to adjust microprocessor controls in order to improve performance. For example, one software thread may evaluate temperature and battery levels, and then adjust processor speed in order to lower overall processor temperature and battery usage. Analogously, software threads may evaluate cache or disk memory, and then adjust memory allocation policy (e.g., defining sizes and locations of future allocations of memory blocks) to maximize or otherwise enhance performance. Also, software threads may evaluate network utilization, and then adjust memory bandwidth accordingly (e.g., buffering video data for on-demand playback).

In certain implementations, generative DNNs are used to predict microprocessor operations. For example, neural networks (NNs) have the ability to learn the features of various sensors on a microprocessor (e.g., performance counters, register contents, address tables, etc.). A deep network can better capture semantic information between the features of the various sensors and learn spatio-temporal relationships between various features (e.g. periodicity, correlative behaviors, etc.). A generative network can predict internal microprocessor states based on internal inputs (e.g., predict future cache misses based on instruction histograms).

In certain implementations, software can compute and predict microprocessor operations using a trained generative DNN. The software thread can operate on the microprocessor, or remotely on a different computing platform. The software may take as input, for example, sensor data from a microprocessor, and compute the output (e.g., predicted microprocessor operation, control signals, or other state information) using the DNN.

In certain implementations, a set of one or more DNNs, trained on microprocessor sensor data or other data related to one or more computing workloads, may be used to generate outputs for predicting, controlling, and/or informing the operations of the microprocessor or other computing platform, and/or the operations of one or more computing devices generally. The predictions, control signals, or other information generated by one or more DNNs in the set of DNNs can be used to improve overall system performance. The DNN set can be used for other applications as well, including anomaly detection in malware detection, power management, etc.

In various configurations, one or more DNNs can be computed on a microprocessor, using standard computing logic (e.g., arithmetic logic units, multipliers, floating point units, DSPs, etc.), programmable logic (e.g., a field-programmable gate array (FPGA), configurable circuits, etc.), application-specific integrated circuit (ASIC) circuitry (e.g., tensor processors, differential analysis circuits, etc.). In certain implementations, using hardware accelerators (e.g., programmable logic or ASIC circuitry) can enable real-time performance of the DNN for prediction of microprocessor operations.

In one or more embodiments, software processes can evaluate the performance of the DNN by correlating the results of the DNN (e.g., accuracy of the DNN prediction)

against actual microprocessor operation. If the performance is not sufficient (e.g., too high false alarm rate), a DNN configuration (e.g., weights and other parameters of the DNN) can be used in the DNN computation. In certain embodiments, the DNN configuration can be preloaded into memory for use by hardware accelerators. The software process can also evaluate the current workload (e.g., multimedia, spreadsheet, web browsing, etc.) and load the appropriate DNN configuration to achieve high performance, customized to a user preference for personalization.

In certain implementations, a software system can be used to train a DNN using microprocessor sensor data or other data related to one or more computing workloads, such that the trained DNN can provide outputs for predicting, controlling, and/or informing the operations of the microprocessor or other computing platform, and/or the operations of one or more computing devices generally. The DNN can be trained using, for example, training data from a microarchitecture or other simulator. The simulator may take input instructions and test data from a software benchmark suite, and generate training data that includes microprocessor sensor data, microprocessor state information, microprocessor outputs, etc.

In various configurations, a DNN training software system can train different DNN configurations (e.g., weights and other parameters of the DNN) for different workloads. The software system may select domain-specific workloads (e.g., multimedia, spreadsheet, web browsing, etc.) from the software benchmark suite, and generate domain-specific training data for DNN training. The resulting DNN configuration can thus be optimized for high performance for the specific workload domain.

In one or more embodiments, a software system may be used to design circuitry in a microprocessor. In one embodiment, the circuitry includes control circuitry and the datapath (e.g., standard computing logic such as arithmetic logic units, multipliers, floating point units, DSPs, etc.), programmable logic (e.g., FPGA, configurable circuits, etc.), ASIC circuitry (e.g., tensor processors, differential analysis circuits, etc.), etc.

An example microprocessor design software system (MDSS) includes the DNN training software system, and it generates DNN hardware that can be used to provide outputs (such as prediction signals, control signals, or other information) that can be used, for example, for predicting, controlling, and/or informing the microprocessor or other components of one or more computing devices. The MDSS takes, as input, training data specific to a computing workload, and generates DNN circuitry consisting of hardware implementations of the mathematical operations for the DNN algorithm. MDSS also generates the DNN configurations (e.g., weights and other parameters) that can be used by the DNN hardware.

Traditional microprocessor architecture is designed to achieve best overall performance for a selected benchmark suite. That is, general overall performance is desired for the microprocessor such that the hardware performance is agnostic to specific workload. Using MDSS, specific DNN configurations can be loaded into the DNN hardware in the microprocessor to achieve desired performance. The DNN configuration may statistically capture typical microprocessor behavior, such that the DNN can provide outputs that may be used, for example, to control and/or predict overall microprocessor function. The DNN can generate information to inform the local or remote computing platform of the current and predicted states.

In one or more embodiments, federated DNNs, trained on, for example, microprocessor sensor data and/or other data related to one or more computing workloads, may output signals (such as control signals, prediction signals, warning signals, inputs for one or more neural networks, etc.) that can be used to predict, control, and/or otherwise inform a computing platform and/or operational optimization/management thereof. The federated DNN (e.g., a DNN in a series of DNNs working together in a network) may be operable in either hardware or software embodiments, as well as embodiments involving a combination of hardware and software. The federated DNN may include a trained generative DNN with additional inputs from external federated DNNs. Collectively, the federated DNNs can operate together to set operation of one or more microprocessors and other aspects of the computing platform. For example, in a cloud network server, the federated DNNs can reside in the microprocessor, the system controller, network controller, and/or other computing elements of the network server.

Traditional network servers may seek to maintain operational efficiency by load balancing the computing and network traffic. In one or more embodiments, microprocessor and server operation can be predicted in real-time to enable optimal operational efficiency. Federated DNNs can evaluate the performance of one or more computing platforms by correlating predicted results against actual operation. If performance is not sufficient, a different federated DNN configuration (with different weights and other parameters, for example) can be used to customize the federated DNNs for different server workloads (e.g., based on a community of users).

In one or more implementations, control elements of a processor are implemented using one or more DNNs, such as generative DNNs. Processors operationally optimized or otherwise controlled via outputs from DNNs can learn, for example, how to operate their processing datapaths more effectively for different processing workloads. In one or more configurations, the processor provides a data-driven approach to tuning processor activity based on statistical data for particular workloads, rather than heuristic logic that is generalized for all workloads.

In contrast to conventional microprocessor control logic, which is based essentially on FSM (finite state machine), in example configurations, the disclosed systems and methods may replace all FSM circuitry with a DNN. In example embodiments, the neural network used (1) may be deep in layers to capture the semantic relationships within the inputs, and (2) may learn internal representations using a generative learning algorithm in order to predict processor states.

In one or more example embodiments, a deep learning algorithm with generative properties is used to learn processor activity. A deep neural network (DNN), for example, includes many layers useful to capturing higher-level semantic association between its inputs. The DNN learns time-series patterns and can predict patterns in a data sequence. Generative models learn internal representations of internal variables and can thus better learn complex data sequences. In comparison, discriminative models, like the many learning algorithms for perceptrons, only model output target variables, and therefore, cannot effectively express complex relationships between the observed and target variables.

In various configurations, more "powerful" or "expressive" learning generative algorithms are used to better model processor activity. As further discussed below, the generative model can predict branches in the datapath using only the flow of instructions. That is, the generative DNN learns as a temporal function of the executed instructions to detect and predict processor activity. Previous branch predictors include other processor state information, including branch addresses stored in tables. A more capable generative learning algorithm can better address (1) latency by using fewer inputs to compute the prediction, and (2) performance by learning more complex interactions between microarchitecture subcomponents in a massively parallel machine.

For example, graphics processing units (GPUs) have a large number of processor cores, and activity prediction is a complex problem due to the high level of contention among thousands of parallel threads and data dependencies on input data. In one or more embodiments, sustained operational throughput can be achieved using generative DNNs to learn complex processor interactions in complex computation workloads.

In other embodiments, the approach of using a DNN can be extended to other control elements in a processor microarchitecture. Such a processor may leverage conventional microprocessor architecture (e.g., reduced instruction set computer (RISC) architecture) and incorporate neural elements to enable the system to learn and adapt. Processor adaptability here extends beyond the ability of software to provide signals for use in control of hardware, or programmable hardware fabrics in field-programmable gate arrays (FPGAs). Such adaptability allows the processor to tune its own control elements in a data-driven fashion using statistical data from operating workloads. Program software need not be modified (e.g., using self-modifying code), nor do hardware circuits need to be modified. Rather, the processor is able to tune its own processing datapath by learning the workload activity that it encounters. This aspect of personalization to a user (e.g., on a laptop), or a community (e.g., on a cloud), can allow for self-tuning and adaptation for improved performance and robustness.

Referring to FIG. 1, a set of one or more DNNs 100 may receive certain data as inputs (indicated by lines with arrowheads extending to DNN set 100) and provide certain data as outputs (indicated by lines with arrowheads extending away from DNN set 100). In the implementations depicted, DNN set 100 may receive sensor data 105, which may include any data acquired by making any measurements corresponding to the operation of one or more computing devices and/or one or more components of the one or more computing devices. The measurements may relate to, for example, the condition/state of hardware, such as the temperature of a computing component (such as a processing unit) acquired using one or more temperature sensors at or near the component. The measurements may also involve events occurring as a result of the flow of data, as measured with a physical sensor or counted using one or more software modules. Accordingly, the sensors providing sensor data 105 need not necessarily be embodied in discrete pieces of hardware, but instead may involve, for example, a software module tasked with measuring, for example, network traffic, or counting, for example, the occurrence of a type of operation or event being observed (such as the number of times an instruction is received at a processing unit).

The DNN set 100 may also receive processing data 110 corresponding with, for example, instructions received at one or more processing units, data flow or events in a datapath of a processor, or outputs from one or more processing units. The instructions received for execution by one or more processing units correspond with the operations of the processing units, and providing the instructions as inputs to DNN set 100 may allow the DNNs in the DNN set 100 to recognize relationships between the instructions and certain behavior of one or more computing devices. The DNN set 100 may additionally or alternatively receive, as inputs, neural network (NN) outputs 115. That is, other NNs involved in the operational management of one or more computing devices, or otherwise tasked with applying learning models to data relevant to the operation of the computing devices, may output data that is useful as inputs to the DNN set 100. The NN outputs 115 may be outputs generated by any NNs, such as one or more DNNs (in the DNN set 100 or otherwise) or by one or more shallow NNs.

The DNN set 100, which may include generative DNNs, generates one or more outputs according to learned parameters. For example, one or more DNNs in DNN set 100 may output control signals 120 that may be fed to one or more components or modules of one or more computing devices. The control signals 120 may direct control of, for example, one or more processing units, such as by controlling one or more datapaths of the processing units. That is, control signals may direct the processor via, for example, control circuitry of the datapath. The DNN set 100 may additionally or alternatively output predictions 125, which may be received by, for example, one or more applications tasked with control/management operations. For example, a prediction may be used by an application to make determinations related to power management, anomaly detection, etc., as further discussed below. The applications may provide control signals based on the predictions 125, such as ramping up/down voltage or current to a processing unit or other component, or issuing a warning signal to indicate that malware is suspected. The DNN set 100 may itself generate outputs that serve as warning signals 130 based on relationships among inputs. Outputs of the DNN set 100 may also serve as inputs to other neural networks, such as one or more DNNs (in the DNN set 100 or otherwise) or one or more shallow NNs.

Figure 2:
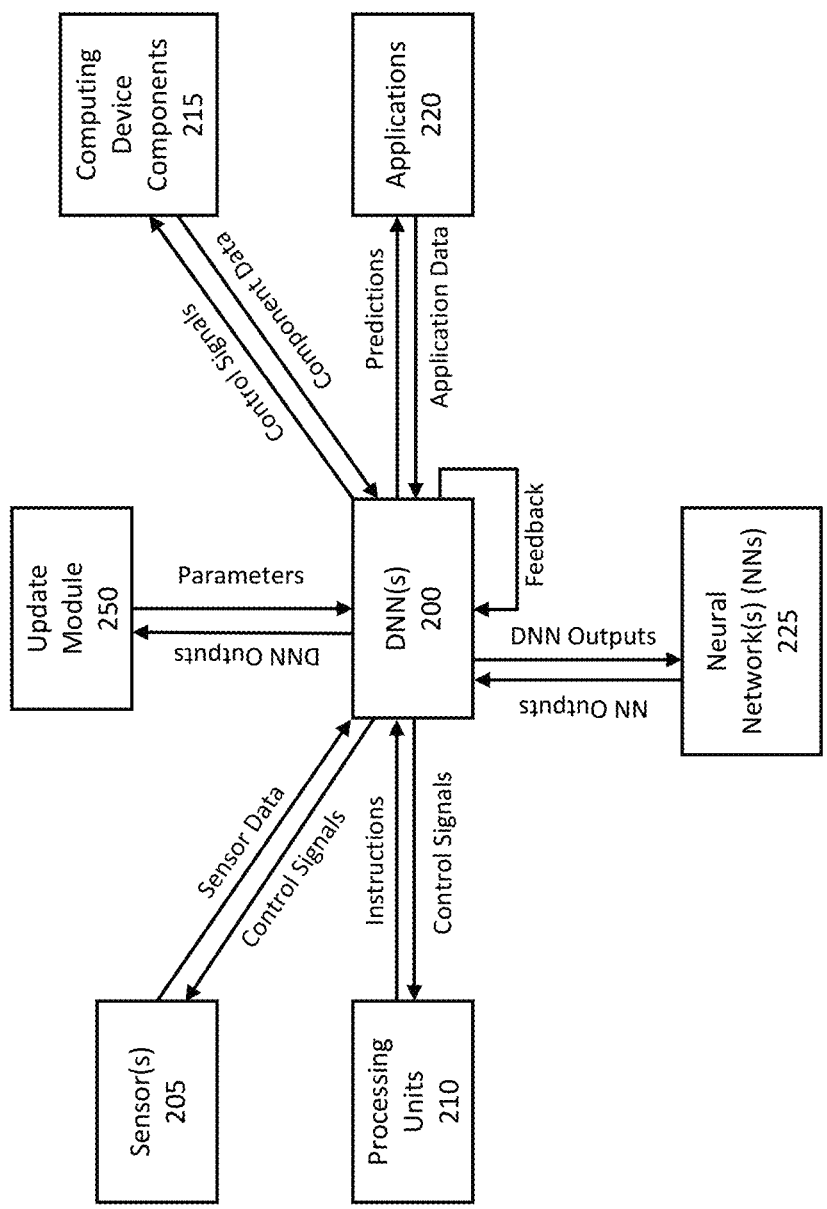
FIG. 2 depicts components and modules with which a set of one or more DNNs may interact, in accordance with one or more embodiments.

Referring to FIG. 2, a DNN set 200 may interface with one or more components or modules. For example, DNN set 200 may receive sensor data from one or more sensors 205, which as suggested above, may be any source of a measurable value related to one or more computing devices. The DNN set 200 may also provide control signals to sensors 205. The DNN set 200 may additionally interface with one or more central processing units 210 (such as one or more central processing units (CPUs), graphics processing units (GPUs), field-programmable gate arrays (FPGAs), and/or digital signal processors (DSPs) of one or more computing devices), from which it may receive processing data such as instructions received at the processing units 210 for execution. The DNN set 200 may feed the processing units 210 with control signals that may be based on instructions received at the processing units 210 for execution. The DNN set 200 may moreover interface with one or more computing device components 215, such as memory modules, peripheral devices, communications devices, etc., to receive component data (e.g., data flow in the other components, or data otherwise related to their operation). The DNN set 200 may also provide to computing device components 215 control signals, predictions, etc. that may be used in, for example, control or other operational management of the computing device components 215.

The DNN set 200 may provide predictions to one or more applications 220. These applications may include, for example, a power management module (PMM) for controlling power supplied to various devices. A PMM may manage the power to, for example, one or more sensors 205, processing units 210, computing device components 215, etc.

Power management may effect control of current/voltage supplied, or may involve powering devices on or off. Other applications 220 may include an anomaly detector, which may be part of a security module tasked with recognizing and countering malware, cyberattacks, etc. The applications 220 may also, in certain configurations, provide application data that may be used as inputs to one or more DNNs in the DNN set 200. Such application data may include, for example, the current power state of a component, the likelihood of a security threat, etc.

One or more DNNs in DNN set 200 may also interface with one or more neural networks (NNs) 225, such as one or more DNNs or one or more shallow NNs. One or more NNs 225 may feed their outputs to one or more DNNs in DNN set 200 for use as inputs, and/or one or more DNNs in DNN set 200 may feed their outputs to NNs 225 for use as inputs. The DNN set 200 may also interface with itself to provide feedback. That is, one or more outputs of one or more DNNs in the DNN set 200 may serve as one or more inputs to one or more DNNs in the DNN set 200. It is noted that the outputs of any particular DNN may feed into itself, or into another DNN in the DNN set 200 to provide feedback.

In certain implementations, the DNN set 200 may interface with an update module 250, which may feed one or more DNN parameters (such as updated weights) to one or more DNNs in the DNN set 200. The update module 250 may provide revised parameters based on training that occurred subsequent to the training that generated the learned parameters being used by one or more DNNs in the DNN set 200. The update module 250 could also receive DNN outputs for use, for example, in determining updated parameters (or in deciding whether updated parameters re desired). By interfacing with the DNN set 200, the update module 250 could in certain implementations allow for enhanced personalization of the DNNs in the DNN set 200, to achieve better optimization based on actual or changed computational workloads.

Figure 3:
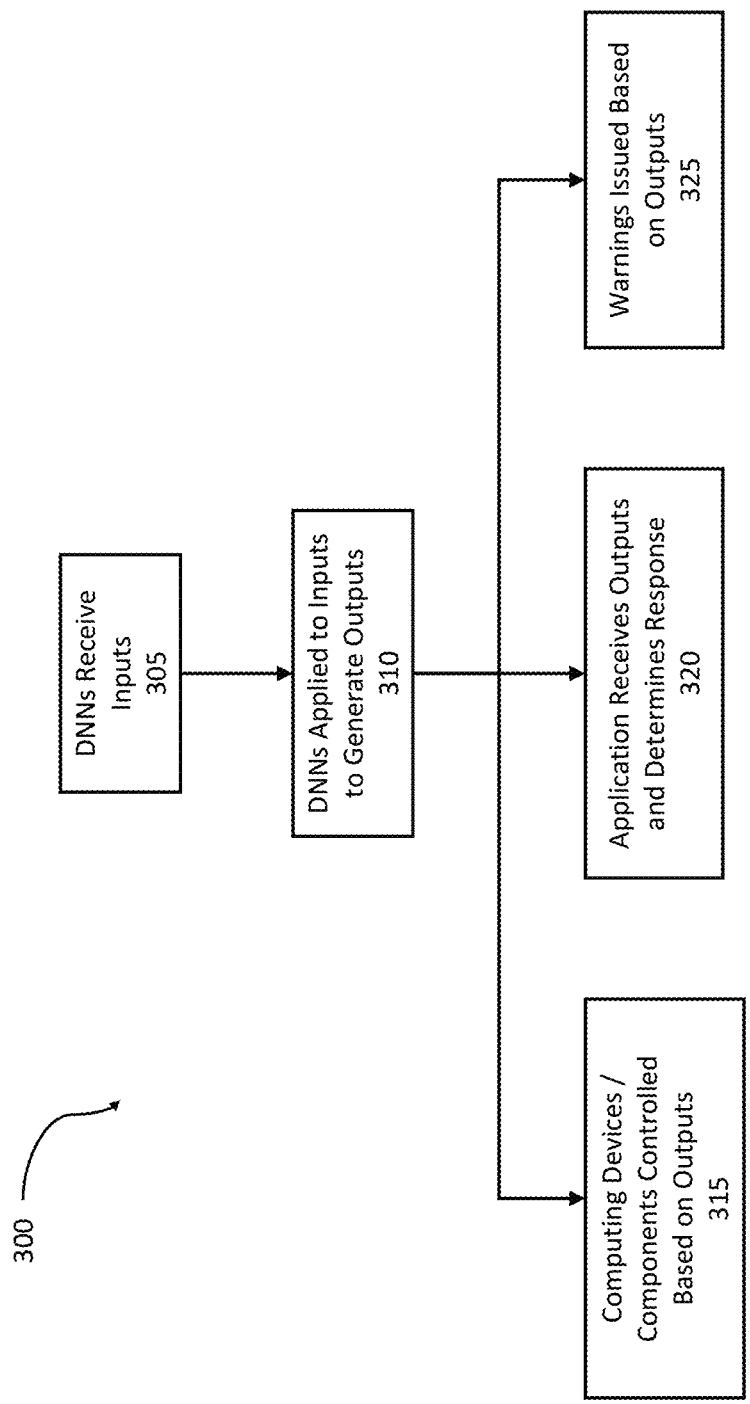
FIG. 3 depicts an example process involving the application of one or more DNNs to generate outputs, in accordance with one or more embodiments.

Referring to the example process in flowchart 300 of FIG. 3, one or more DNNs receive one or more DNN inputs (305), as discussed above. The DNNs, which may be generative DNNs, may be applied to the received inputs to generate DNN outputs (310), which may be used in different ways. For example, one or more components may be controlled by providing control signals to one or more computing devices (or one or more components thereof) using the DNN outputs as control signals (315). The DNN outputs may additionally or alternatively be provided to one or more applications, which then determine a suitable response (320), or may serve as warning signals if, for example, relationships between inputs indicate a failure or other undesirable state.

Figure 4:
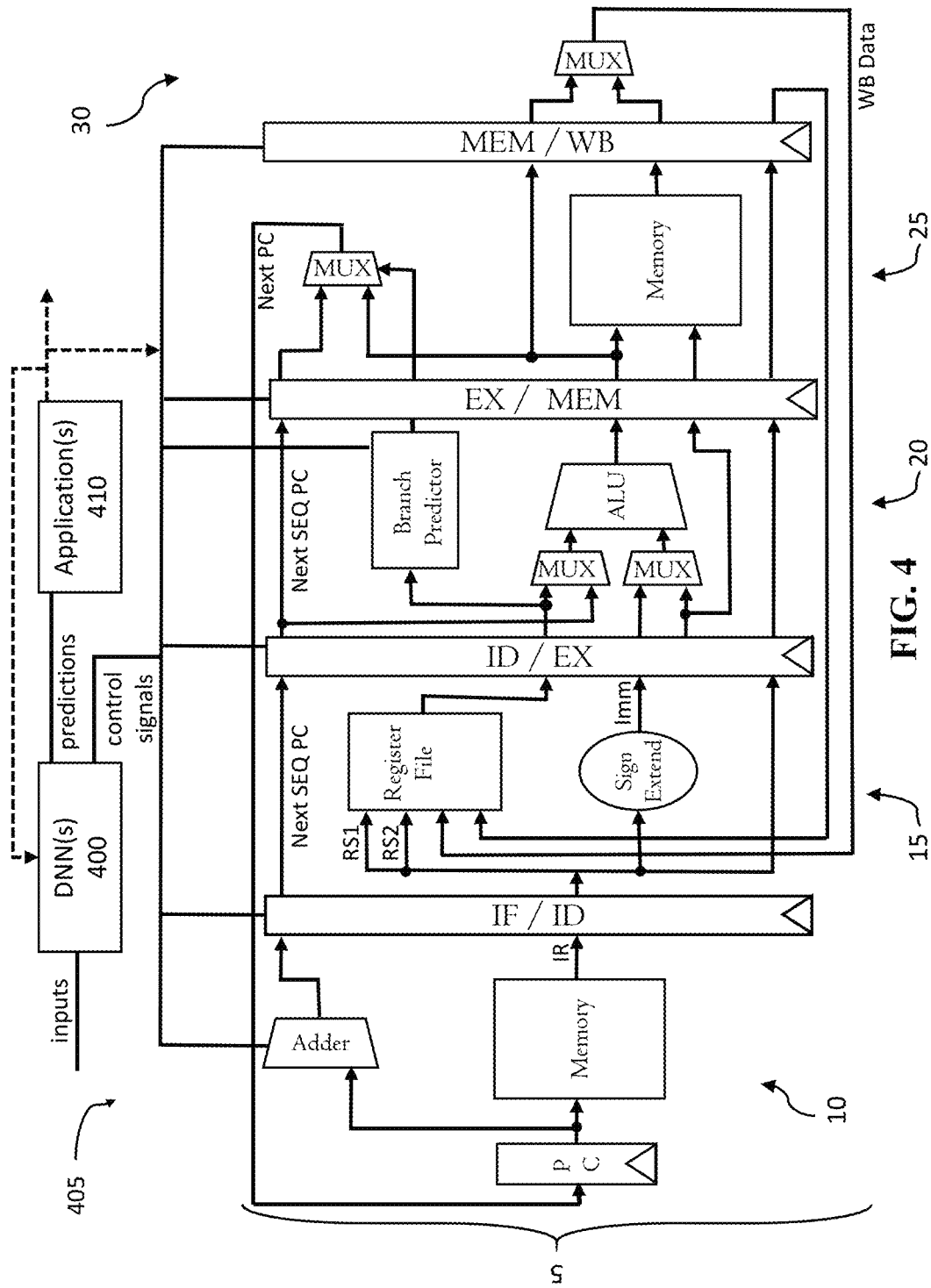
FIG. 4 depicts an example processor system architecture in which a control unit includes a DNN that sends control signals to a datapath of a processor, in accordance with one or more embodiments of the invention.

Referring to FIG. 4, in one or more implementations, one or more DNNs in DNN set 400 may provide control signals to a processing unit 405 or predictions to an application module 410. A conventional processor (RISC) architecture with a 5-stage pipeline can be modified to implement a processing architecture with neural network-based control. A datapath 5 may include, for example, various processing stages: instruction fetch 10 ("IF"), instruction decode 15 ("ID"), execution 20 ("EX"), memory access 25 ("MEM"), and write back 30 ("WB"). Modern architectures may include deeper pipelines to better leverage instruction level parallelism. Control signals may orchestrate the operation of some or all of the components in the pipeline, from memory access to branch prediction.

In one or more embodiments, one or more generative DNNs 400 may be used to control elements of the pipelined processing unit 405. The DNN 400 may receive, as inputs, information about the processor and its operation, such as instruction streams and sensor data providing information on, for example, network traffic, temperature, performance counters, etc. The DNN 400 may generate, as output, control signals for (for example) datapath elements of a pipelined processor. The expressive nature of the generative DNN may help find the relationships between the inputs. For example, branches may be taken based on sequences of certain instructions, and the states of caches can be useful in predicting processor state.

In various configurations, the generative DNN 400 is capable of predicting patterns in data sequences. The processor state may be modeled as a temporal function of the executed instructions with the intuition that the flow of instructions can be identified as distinct activities of the code. As depicted in FIG. 4, DNN set 400 may, in one or more embodiments, additionally output processor predictions (related to processor operation/state) to application module 410, which may be part of the processor or external to (separate from) the processor.

Example application modules 410 include, for example: a power management system tasked with power management for the processor (e.g., ramping voltage and/or current up or down); an anomaly detector/cyber-security module tasked with detecting, for example, unexpected branches, faults, and/or exceptions that may be predicted to be indicative of malware or a cyber-attack; a warning system tasked with issuing warnings to other components of the computing system (such as peripheral devices or the operating system) that certain undesirable processor states are predicted (such as overheating); and/or a personalization module/training module that is able to feed revised parameters to the DNN to replace/supplement parameters of the DNN to personalize, fine-tune, or otherwise alter DNN function. The new parameters may be based on, for example, observations of processor operation (either the processor in which the DNN is located, or other processors), and the new parameters may be "learned" by the application module, or received via, for example, a network connection. In various implementations, the new parameters may, for example, enhance processor performance, improve compatibility with other devices, use power more economically, etc. As depicted by the dotted lines extending out from the application module 410, the application module 410 may provide (output) control signals to processing unit 405, inputs that feed back into DNN set 400, and/or data to other applications/components.

Conventional DNNs tend to treat data as independent static streams, but this can be sub-optimal, especially from the point of view of learning. Generative DNNs can accommodate inherently temporal properties as well as non-stationary aspects of data such as drift in data characteristics. Deep temporal models include, but are not limited to, Hierarchical Temporal Memory (HTMs), recurrent neural networks (RNNs), and certain Restricted Boltzmann Machine (RBM) variants, including Conditional RBMs (CRBMs), Temporal RBMs (TRMBs), and Recurrent TRBMs (RTRBMs) as applied to temporal data.

Figure 5:
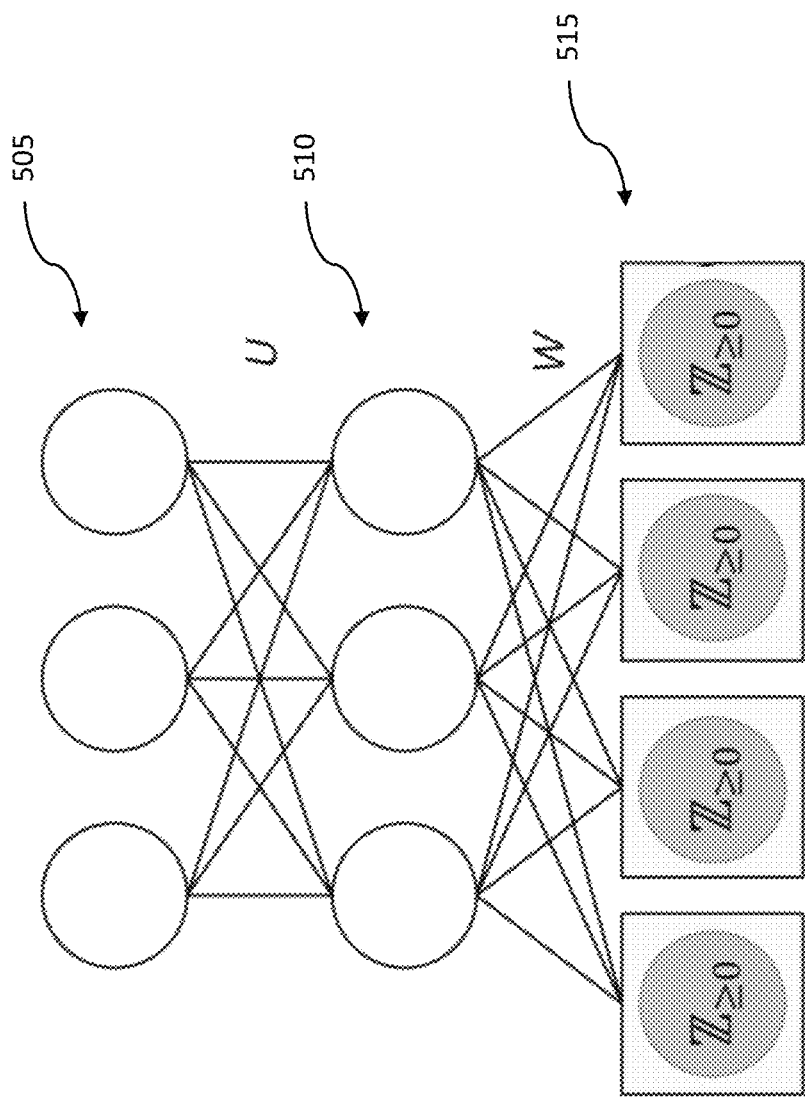
FIG. 5 depicts a DNN that can be used to generate outputs for optimizing or otherwise managing computing operations of one or more computing devices or components (such as processing units or other devices) thereof, in accordance with one or more embodiments.

FIG. 5 depicts an example generative DNN based on a CRBM model with labels (y) 505, hidden layer (h) 510, and visible layer ($v_t$) 515. In certain configurations, the CRBM is extended to the discriminative CRBM (DCRBM), and finally, CountDCRBM, as in the GPU configurations discussed below. The input to this model (referred to as visible units) may be, for example, an instruction mix per time step (that is, the histogram of counts of instructions being executed). Using a GPU simulator to provide training data, it can be shown that with only a small instruction window, cache misses can be predicted, and thus, that a more capable learning model is beneficial. Results of certain tests (discussed below) have shown prediction at, for example, 5 and 128 cycles into the future.

Details of the generative DNN, including the learning algorithm, results, and analysis pertaining to the branch prediction with respect to example GPU applications, are further discussed below. Such DNNs could learn, e.g., using Contrastive Divergence, via bottom-up and top-down passes using various sampling equations. The generative DNN using the CountDCRBM would be an example implementation of the generative DNN set depicted in FIG. 4.

Such an approach has many benefits in many domains, as it is a fundamental method for activity prediction. With respect to the semiconductor and computer architecture community, it can reinvent methods for processor design (CPU/GPU/etc.). For example, processor designers, instead of codifying and implementing circuits for branch prediction or other control logic, could use a data-driven approach in which sufficient training data is collected. Compilers could analyze and identify mixes of instructions that cause performance bottlenecks and schedule them dynamically based on statistical inference. Moreover, processor activity can be predicted to dynamically set voltage, current, and other system level parameters.

In some embodiments, the generative DNN can be trained on-line, so as to tune the processor performance based on particular workloads. The workloads used in training can be based on individual use (e.g. single user on a laptop), or multiple users (e.g. community of users on a cloud system). The generative DNN can take, as inputs, processor data from a single processor core or across multiple cores (e.g. parallel processor such as a multicore CPU or GPU).

In cyber-security oriented implementations, example generative DNNs may be tuned to detect possible anomalies. Additionally, a sequence of events can be reverse engineered to arrive at a collection of instructions that may be intrusive or undesirable. A warning signal could generated when, for example, a predicted processor state does not match the actual state. For example, certain processor events may not occur at particular times or with certain patterns as expected, or certain events may be observed at particular times or with certain suspicious or otherwise unlikely patterns. In certain configurations, the generative DNN may learn normal processor behavior, which could be altered by active malware (e.g., unexpected branching and/or faults and exceptions). More complex behaviors (e.g., unexpected sequences of instructions or events) can also trigger a warning (e.g., a read from memory and transfer of data over a network). The generative DNN, on the processor itself, can thus be involved in learning and monitoring processor behaviors.

Example implementations of the disclosed approach will now be discussed in the context of GPU activity prediction, and in particular, prediction of GPU cache misses. Processor events can be predicted as temporally-extended activities in a stream of instructions. A novel temporal representation learning approach using DCRBM (Discriminative Conditional Restrictive Boltzmann Machines) to learn a representation of processor states is used. This example illustrates a data-driven approach that can identify mixes of instructions that cause performance bottlenecks. Although the discussion focuses on cache misses, any statistic of interest to the computer architecture (such as power consumption and voltage) may be predicted. For example, in one or more implementations, the generative DNN may be tuned to predict processor behavior that impacts power consumption.

Voltage can be ramped down as low as possible, until there is a need (e.g., a predicted need based on observations about processor operation) to ramp up. The generative DNN may additionally or alternatively be tuned to predict processor behavior that impacts network traffic. For example, network bandwidth allocation (e.g., via an Internet router) can be requested in advance, based on predictions made by the DNN.

General Purpose GPUs (GPGPUs) achieve high throughput execution via a high level of parallelism. Predicting GPU Cache Misses is complex due to the high level of contention among thousands of threads. Cache contention is a bottleneck for parallel execution when many threads are waiting for cache operation, causing the addition of more threads (or cores) to be detrimental. Predicting whether a cache miss is about to occur is useful for better cache management, such as cache bypassing, pre-fetching, prioritized allocation, etc. Further, cache misses indirectly cause increased energy and power usage because of second order effects beyond memory latency. The disclosed approach is amenable to predicting such higher order events (such as voltage scaling and faults) either directly or via hierarchical modeling.

In this discussion, processor and system dynamics will be modeled so as to predict processor activity. A new model that can predict key processor events that limit processor throughput will be discussed. A new variant of the Conditional Restricted Boltzmann Machines (CRBMs) may be used to directly address system performance and reliability. CRBMs can efficiently model short-term temporal phenomena. An extension to CRBMs can be implemented to process time-series histograms of processor instructions for processor activity prediction. CRBMs may be extended with a discriminative component at the output layer, and a Count distribution at the input layer. This new model enables processing of processor instructions and recognizing of various types of activities. Unlike linear single-layer networks, the disclosed model accounts for time-series and count data in predicting cache misses.

In certain implementations, a simulator for CUDA is used to generate a dataset for training the model. This approach can be used in real-time by incrementally augmenting the dataset. It is noted that the predictor is naturally agnostic to the hardware and architecture as it relies on execution traces. Multiple repeated executions can even lead to increased predictive power because more data is available for machine learning.

A sequence of models, gradually increasing in complexity, will now be discussed so that the different components of the example model can be understood in isolation. The discussion starts with the basic CRBM model, then extends to the discriminative DCRBM, and finally CountDCRBM. The input to the model (referred to as visible units) is an instruction mix per time step, that is, the histogram of counts of instructions being executed, obtained from the GPU simulator. The labels are any chosen performance metric also output by the simulator.

CRBMs are a natural extension of RBMs for modeling short term temporal dependencies. A CRBM is an RBM which takes into account history from the previous time instances t–N, . . . , t–1 at time t. This is done by treating the previous time instances as additional inputs. Doing so does not complicate inference. v is a vector of visible nodes, h is a vector of hidden nodes, and $v_{<t}$ is the visible vectors from the previous N time instances, which influences the current visible and hidden vectors. $E_C$ is the energy function, and Z is the partition function. The parameters θ to be learned are a and b, the biases for v and h, respectively, and the weights W. A and B are matrices of concatenated vectors of previous time instances of a and b. The CRBM is fully connected between layers, with no lateral connections. This architecture implies that v and h are factorial given one of the two vectors. This allows for the exact computation of $p_C(v|h, v_{<t})$ and $p_R(h|v, v_{<t})$. A CRBM defines a probability distribution $p_C$ as a Gibbs distribution (Eq. 1):

$$p_C(v_t, h_t|v_{<t}) = \exp[-E_C(v_t, h_t|v_{<t})]/Z(\theta). \quad (1)$$

The energy function $E_C(vt, ht|v_{<t})$ in Eq. 2 is defined in a manner similar to that of the RBM.

$$E_{C-Real}(v_t, h_t|v_{<t}) = -\Sigma_i(c_i - v_{i,t})^2/2 - \Sigma_j d_j h_{j,t} - \Sigma_{i,j} v_{i,t} w_{i,j} h_{j,t}$$

$$E_{C-Binary}(v_t, h_t|v_{<t}) = -\Sigma_i c_i v_{i,t} - \Sigma_j d_j h_{j,t} - \Sigma_{i,j} v_{i,t} w_{i,j} h_{j,t}$$

$$E_{C-Count}(v_t, h_t|v_{<t}) = -\Sigma_i (c_i v_{i,t} - \log(v_{i,t}!)) - \Sigma_j d_j h_{j,t} - \Sigma_{i,j} v_{i,t} w_{i,j} h_{j,t} \quad (2)$$

The probability distributions for the visible nodes are defined in Eq. 3:

$$p_{C-Real}(v_{i,t} | h_t, v_{<t}) = \mathcal{N}\left(c_i + \sum_j h_{j,t} w_{i,j}, 1\right), \quad (3)$$

$$p_{C-Binary}(v_{i,t} = 1 | h_t, v_{<t}) = \sigma\left(c_i + \sum_j h_{j,t} w_{i,j}\right),$$

$$p_{C-Count}(v_{i,t} | h_t, v_{<t}) = \mathcal{P}\left(m, \frac{\exp\left(c_i + \sum_j h_j w_{ij}\right)}{\sum_q \exp\left(c_q + \sum_j h_j w_{qj}\right)}\right),$$

where, $\mathcal{N}$ is a normal distribution, $\sigma$ is a sigmoid distribution, and P is a Poisson distribution. The hidden nodes are defined in Eq. 4:

$$p_C(h_{j,t} = 1 | v_t, v_{<t}) = \sigma\left(d_j + \sum_i v_{i,t} w_{i,j}\right). \quad (4)$$

where, $$c_i = a_i + \sum_p A_{p,i} v_{p,<t}, \quad d_j = b_j + \sum_p B_{p,j} v_{p,<t}. \quad (5)$$

DCRBMs can be based on a model generalized to account for temporal phenomenon using CRBMs. DCRBMs are a simpler version of the Factored Conditional Restricted Boltzmann Machines and Gated Restricted Boltzmann Machines. Both models incorporate labels in learning representations, but they use a more complicated potential which involves three way connections into factors. DCRBMs define the probability distribution $p_{DC}$ as a Gibbs distribution (Eq. 6):

$$p_{DC}(y_t, v_t, h_t|v_{<t}; \theta) = \exp[-E_{DC}(y_t, v_t, h_t|v_{<t})]/Z(\theta). \quad (6)$$

The hidden layer h is defined as a function of the labels y and the visible nodes v. A new probability distribution for the classifier is defined to relate the label y to the hidden nodes h as in Eq. 7:

$$p_{DC}(h_{j,t} = 1 | y_t, v_t, v_{<t}) = \sigma\left(d_j + u_{j,k} + \sum_i v_{i,t} w_{ij}\right), \quad (7)$$

as well as relate h to y as in Eq. 8:

$$p_{DC}(y_{l,t} | h_t) = \frac{\exp\left[s_l + \sum_j u_{j,l} h_{j,t}\right]}{\sum_{l^*} \exp\left[s_{l^*} + \sum_i u_{j,l^*} h_{j,t}\right]}. \quad (8)$$

The new energy function $E_{DC}$ is defined by Eq. 9:

$$E_{DC}(y_t, v_t, h_t | v_{<t}) = \underbrace{E_C(v_t, h_t | v_{<t})}_{Generative} - \underbrace{\sum_{j,l} h_{j,t} u_{jl} y_{l,t} = \sum_l s_l y_{l,t}}_{Discriminative} \quad (9)$$

DCRBM can be is extended to CountDCRBMm, a model generalized to account for temporal phenomenon using CRBMs and discriminative classification. Count-DCRBMs are used to model time varying histograms of counts. The probability distribution over the visible layer will follow a constrained Poisson distribution, $p_{C-Count}(v_{i,t}|h_t, v_{<t})$ defined in Eq. 3, the hidden layer follows Eq. 7, with the label layer follows Eq. 8, and the energy function $E_{C-Count}v_t, h_t|v_{<t})$ defined in Eq. 9.

Inference: to perform classification at time t in the CountDCRBM given $v_{<t}$ and $v_t$, a bottom-up approach may be used, computing a cost for each possible label $y_t$, then choosing the label with least cost. The cost for label $y_t$ is computed to be the free energy $-\log p_{DC}(y_t, v_t|v_{<t})$ computed by marginalizing over $h_{<t}$ and $h_t$. Then, the cost associated with the candidate label is the free energy in the CountDCRBM, namely $-\log p_{DC}(y_t, h_t|h_{<t})$, as the sum over exponentially many terms can be algebraically eliminated.

Learning: parameters could be learned using Contrastive Divergence (CD), where $<.>_{data}$ is the expectation with respect to the data distribution and $<.>_{recon}$ is the expectation with respect to the reconstructed data. The learning may be done using two steps: a bottom-up pass and a top-down pass using sampling equations from (3), (7), and (8). In bottom-up, the reconstruction is generated by first sampling the hidden layer $p(h_{i,j=1}|v_t, v_{<t}, y_t)$ for all the hidden nodes in parallel. In top-down, the bottom-up pass is followed by sampling the visible nodes $p(v_{i,t}|h_t, v_{<t})$ and $p(y_{l,t}|h_t, h_{<t})$ for all the visible nodes in parallel.

An open-source simulator cycle-level GPGPU-Sim was used to generate data to validate this approach. The BACK-Prop problem from the RODINIA benchmark was used, and an NVIDIA GTX480 GPU was simulated with default configurations for GPGPU-Sim. This benchmark CUDA program trains a feedforward neural network with one hidden layer consisting of 4096 units. Tests were conducted on three different caches (Instruction Cache (IC), Data Cache Read (DC_R), and Data Cache Write (DC_W)) localized within one core of the GPU. For each cache, GPGPU-Sim outputs a list of time-indexed binary labels. To complete the dataset, GPGPU-Sim was modified to retrieve the time-indexed list of instruction mix (in PTX format) for each time cycle and the number of different instruction types (based on opcode) executed.

The Count-DCRBM was trained on a Tesla K20C GPU using Contrastive Divergence and a constant learning rate of $10^{-5}$. Table 1 shows the final accuracies of the trained model with varying temporal history available for DCRBM. The second and third columns are metrics that describe predictive power, taking into account false positives and negatives. High accuracy and predictive power of the model are observed for all three caches. Increased history generally leads to better performance despite the increased model complexity.

TABLE 1

| Cache | History | MCC | F1 | Accuracy |
|---|---|---|---|---|
| DC_R | 1 | 0.32 | 0.59 | 0.67 |
| | 5 | 0.35 | 0.63 | 0.68 |
| | 10 | 0.39 | 0.66 | 0.69 |
| DC_W | 1 | 0.36 | 0.58 | 0.70 |
| | 5 | 0.36 | 0.59 | 0.65 |
| | 10 | 0.32 | 0.58 | 0.65 |
| IC | 1 | 0.32 | 0.40 | 0.86 |
| | 5 | 0.32 | 0.39 | 0.87 |
| | 10 | 0.37 | 0.44 | 0.85 |

Table 1 provides scores (MCC, F1, and Accuracy) versus History for different types of cache, where DC_R is Data Read Cache, DC_W is Data Cache Write, and IC is. The best model in each case was selected using Mathews correlation coefficient (MCC). The larger the History, the higher the complexity and training difficulty of the model. According to the table, larger History is better except in the case of Data Write Cache in this configuration.

Figure 6A:
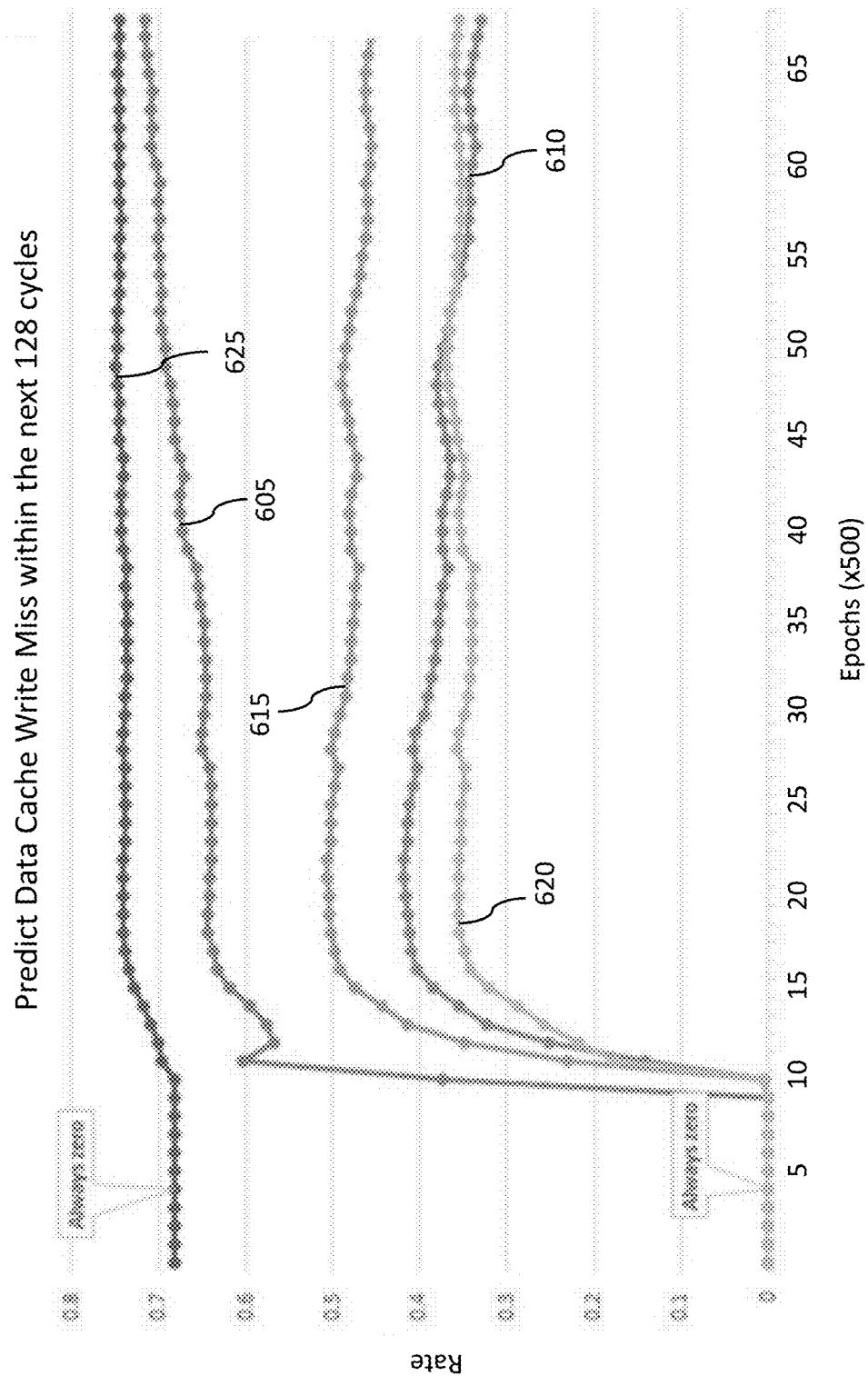
FIG. 6A provides predicted data cache (DC) write misses over multiple training epochs, in accordance with one or more embodiments.
Figure 6B:
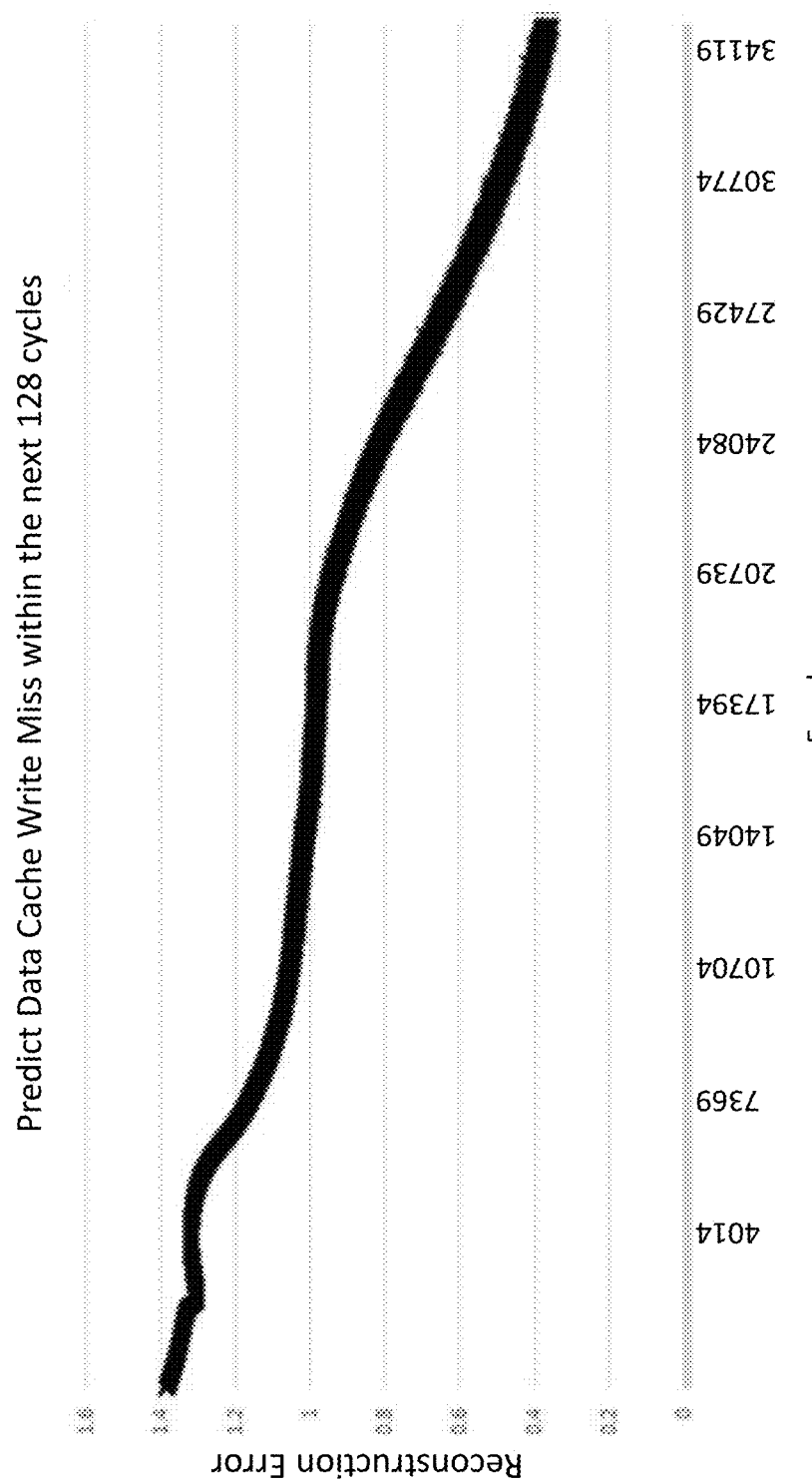
FIG. 6B provides reconstruction error corresponding to the data provided in FIG. 3A.
Figure 6C:
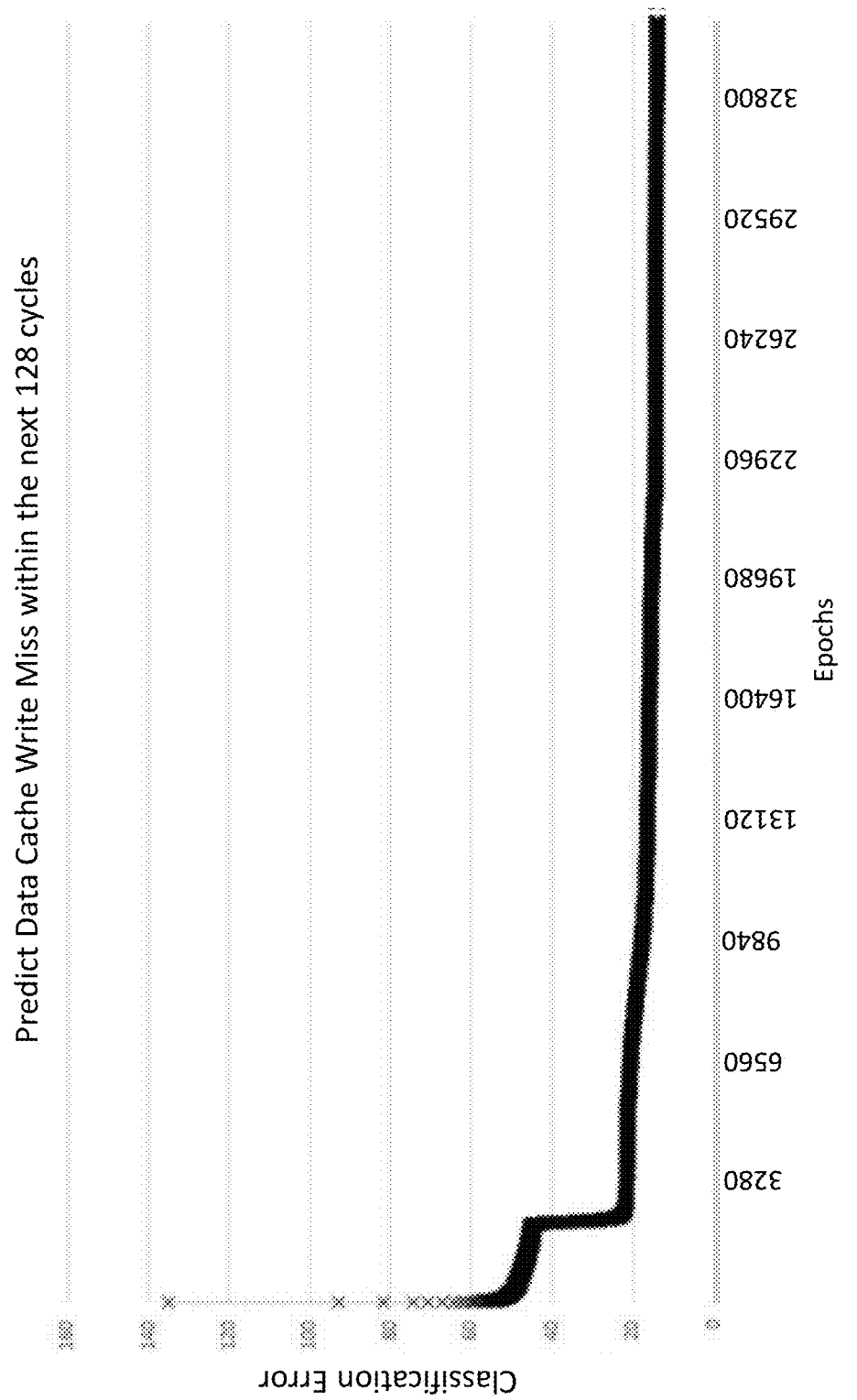
FIG. 6C provides classification error corresponding to the data provided in FIG. 3A.

When considering model accuracy, it should be noted that cache miss events may be relatively rare (e.g., about 10% for IC). FIG. 6A shows cache miss metrics over training epochs for Data Cache Write. Trace 605 corresponds with "precision" or p, also referred to as positive predictive value, or the fraction of relevant instances among retrieved instances. Trace 610 corresponds with "recall" or r, also referred to as sensitivity, or the fraction of relevant instances that have been retrieved over total relevant instances. Trace 615 corresponds with the F1 score or F-score ("F1"), which correlates with a test's accuracy. F1 considers both the precision p and the recall r of the test to compute the score: p is the number of correct positive results divided by the number of all positive results, and r is the number of correct positive results divided by the number of positive results that should have been returned. The F1 score may be interpreted as a weighted average of the precision and recall, where an F1 score reaches its best value at 1 and worst at 0. Trace 620 corresponds with the MCC, which can be used in machine learning as a measure of the quality of binary classifications. Trace 625 corresponds with "accuracy," a statistical measure of how well a binary classification test correctly identifies or excludes a condition. That is, the accuracy is the proportion of true results (both true positives and true negatives) among the total number of cases examined. It is noted that the initial model accuracy is about 70% where the model predicts that cache miss never occurs, with a corresponding metric F1 and MCC value of zero. As training epochs increase, a sharp increase in predictive power is noted around 5000 epochs. FIG. 6B shows the reconstruction error, the objective value for training, over epochs for the data write cache. It is observed that the reconstruction error significantly drops in the first 20,000 epochs. FIG. 6C shows a measure of the classification error, measured in terms of the binary cross entropy between the true and predicted labels. It can also be observed that the classification error continues to drop steadily even though the reconstruction error has converged, showing that the model accounts for label information.

The disclosed approach has significant implications for the GPU revolution of computing. The data driven approach can identify mixes of instructions that cause performance bottlenecks. Although the discussion used cache misses as an example, any statistic of interest to the computer architecture community, such as power consumption and voltage, can be predicted.

It is noted that communicatively coupled computing devices may be interfaced or otherwise connected (via wired or wireless interfaces and/or connections), so as to be able to exchange signals (such as control or other signals), data, messages, etc., using one or more communications protocols and/or communications devices, and/or via one or more communications networks (such as local area networks (LANs), wide area networks (WANs), the Internet, etc.). Transmission technologies may be based on, for example, Ethernet, Wi-Fi, Bluetooth, optical communication, etc. The computing devices, processing units, components of computing devices, neural networks (DNNs or otherwise), sensors, applications, update modules, datapaths, etc., discussed may be communicatively coupled, whether integrated or separate, or whether co-located or remote to each other, in optimizing, controlling, and/or managing operations.

Exemplary versions of the systems and methods discussed use deep neural networks to optimize or otherwise better manage operations of computing devices, such as by generating predictions, control signals, warnings, etc., or by effecting control logic in processors, to provide a significant technological improvement in the functioning and operation of computing devices and/or their processing units or other components. Computing devices can have improved power management, enhanced security detection, increased processing efficiency, etc. Processor design and performance may be enhanced by, for example, reduction of cache misses, detection of malware based on anomalous processing behaviors, better control of power management (including ramping up and down of current and/or voltage), lowered power operation, etc. Workload characteristics can be learned dynamically, allowing for personalization of microprocessor function by tuning control operations based on individual computing needs. Computing systems can tune themselves by learning how to best adapt and remain resilient as computing workloads change over time. When the disclosed approach is implemented, computing devices and processors can accomplish more and perform better than they could otherwise.

The present invention has been described in terms of one or more preferred embodiments, and it should be appreciated that many equivalents, alternatives, variations, additions, and modifications, aside from those expressly stated, and apart from combining the different features of the foregoing embodiments in varying ways, can be made and are within the scope of the invention. In the above description, a number of specific details, examples, and scenarios are set forth in order to provide a better understanding of the present disclosure. These examples and scenarios are provided for illustration, and are not intended to limit the disclosure in any way. Those of ordinary skill in the art, with the included descriptions, should be able to implement appropriate functionality without undue experimentation. References in the specification to an "embodiment," an "example," a "version," an "implementation," a "configuration," an "instance," etc., indicate that the embodiment, example, version, etc. described may include one or more particular features, structures, or characteristics, but not every embodiment, example, version, etc. necessarily incorporates the particular features, structures, or characteristics. Further, when a particular feature, structure, or characteristic is described in connection with an embodiment, it is believed to be within the knowledge of one skilled in the art to effect such feature, structure, or characteristic in connection with other embodiments whether or not explicitly indicated.

Various functions described above, such as the application and training of the deep neural networks involved in optimizing or otherwise managing operations of one or more computing devices, may be implemented in hardware, firmware, software, single integrated devices, multiple devices in wired or wireless communication, or a combination thereof. Computerized functions may be implemented as instructions stored using one or more machine-readable media, which may be read and executed by one or more processors. A machine-readable medium may include any mechanism for storing or transmitting information in a form readable by a machine. For example, a machine-readable medium may include any suitable form of volatile or non-volatile memory. In the drawings, specific arrangements or orderings of schematic elements may be shown for ease of description. However, the specific ordering or arrangement of such elements is not meant to imply that a particular order or sequence of processing, or separation of processes, is required in all embodiments. Further, some connections or relationships between elements may be simplified or not shown in the drawings so as not to obscure the disclosure. This disclosure is to be considered as exemplary and not restrictive in character, and all changes and modifications that come within the spirit of the disclosure are desired to be protected.

The invention claimed is:

1. A computer-implemented method for optimizing operations of one or more computing devices having one or more processing units, the method comprising:
   receiving, as inputs to a first set of one or more deep neural networks (DNNs), at least one of computing environment data selected from a group consisting of:
   1) sensor data corresponding with operation of one or more of the computing devices,
   2) processing data corresponding with a set of one or more instructions received at one or more of the processing units for execution by the one or more processing units,
   3) DNN data corresponding with DNN outputs generated by one or more DNNs involved in managing operations of the one or more computing devices; and
   4) any combination of 1), 2), and 3);
   applying one or more DNNs to the first set of inputs to generate a first set of one or more DNN outputs based on one or more relationships between the received inputs, the one or more DNNs including a first set of DNN parameters learned using one or more computing workloads;
   receiving a second set of one or more DNN parameters to be applied to received inputs; and
   providing the first set of DNN outputs, generated by application of the one or more DNNs, as one or more signals, at least one signal selected from a group consisting of:
   i) control signals for managing one or more operations of one or more of the computing devices;
   ii) predictions for use in generating control signals for managing one or more operations of the computing devices, the predictions corresponding to a future state of one or more of the computing devices;
   iii) warnings indicating that a predicted future state of one or more components of the one or more computing devices deviates more than a threshold deviation level from an acceptable state;
   iv) a second set of one or more inputs to the first set of DNNs and/or to a second set of one or more DNNs involved in managing operations of the one or more computing devices for generation of a second set of one or more DNN outputs; and
   v) any combination of i), ii), iii), and iv);
   whereby the one or more signals are provided to the one or more computing devices to enhance performance, efficiency, and/or security of one or more of the computing devices.

2. The method of claim 1, wherein at least one of the one or more DNNs is a generative DNN.

3. The method of claim 1, wherein one or more of the DNNs in the first set of DNNs is implemented within a tool for creating an optimal processor design.

4. The method of claim 1, wherein the first set of DNN outputs includes predictions of a future state of one or more of the processing units of the computing devices.

5. The method of claim 1, further comprising creating a new processor design within a design environment by utilizing the predictions of a future state.

6. The method of claim 1, wherein the first set of DNN outputs includes control signals for managing operations of one or more datapaths of the processing units.

7. The method of claim 1, wherein the first set of DNN outputs includes one or more control signals for and/or one or more predictions used for, generating one or more control signals for adjusting a current or voltage supplied to one or more of the processing units.

8. The method of claim 1, wherein the first set of DNN outputs includes one or more signals for and/or one or more predictions used for, generating one or more control signals for shutting down one or more components of the computing devices.

9. The method of claim 1, wherein one or more of the DNNs in the first set of DNNs is trained using contrastive divergence (CD), wherein: DNN parameters are learned via at least one bottom-up pass followed by at least one top-down pass; in the bottom-up pass, all hidden nodes of a hidden layer of the DNN are sampled in parallel; and in the top-down pass, all visible nodes are sampled in parallel.

10. The method of claim 1 wherein the second set of DNN parameters is based on the first set of DNN outputs.

11. The method of claim 1, wherein one or more of the DNNs in the first set of DNNs is implemented using circuitry in one or more of the processing units.

12. The method of claim 1, wherein the one or more DNNs are applied using a first processing unit, and the at least one signal includes at least one control signal for a second processing unit.

13. A computer-implemented method for optimizing operations of one or more computing devices having one or more processing units, the method comprising:
   receiving, as inputs to a first set of one or more deep neural networks (DNNs), at least one of computing environment data selected from a group consisting of:
   1) sensor data corresponding with operation of one or more of the computing devices,
   2) processing data corresponding with a set of one or more instructions received at one or more of the processing units for execution by the one or more processing units,
   3) DNN data corresponding with DNN outputs generated by one or more DNNs involved in managing operations of the one or more computing devices; and
   4) any combination of 1), 2), and 3);
   applying one or more DNNs to the first set of inputs to generate a first set of one or more DNN outputs based on one or more relationships between the received inputs, the one or more DNNs including DNN parameters learned using one or more computing workloads; and providing the first set of DNN outputs, generated by application of the one or more DNNs, as one or more signals, at least one signal selected from a group consisting of:
  i) control signals for managing one or more operations of one or more of the computing devices;
  ii) predictions for use in generating control signals for managing one or more operations of the computing devices, the predictions corresponding to a future state of one or more of the computing devices;
  iii) warnings indicating that a predicted future state of one or more components of the one or more computing devices deviates more than a threshold deviation level from an acceptable state;
  iv) a second set of one or more inputs to the first set of DNNs and/or to a second set of one or more DNNs involved in managing operations of the one or more computing devices for generation of a second set of one or more DNN outputs; and
  v) any combination of i), ii), iii), and iv);

whereby the one or more signals are provided to the one or more computing devices to enhance performance, efficiency, and/or security of one or more of the computing devices, wherein the one or more DNNs are applied using a first core of a processing unit, and the at least one signal includes at least one control signal for a second core of the processing unit.

14. The method of claim 1, wherein received inputs include information on network traffic.

15. The method of claim 1, wherein received inputs include information on a temperature of one or more of the processing units.

16. A system for optimizing processing operations of one or more computing devices, the system comprising:
  a first computing device having a first hardware processing unit and a first deep neural network (DNN) configured to:
  receive at least one DNN input selected from a group consisting of:
  a. sensor data corresponding with operation of: (i) the first computing device, (ii) a second computing device with which the first computing device is communicatively coupled, or (iii) both (i) and (ii),
  b. processing data corresponding with one or more instructions received at: (i) the first hardware processing unit, (ii) a second processing unit of the second computing device, or (iii) both (i) and (ii),
  c. DNN data corresponding with one or more outputs from: (i) the first DNN, (ii) a second DNN, or (iii) both (i) and (ii), and
  d. any combination of 1), 2), and 3); and
  provide one or more DNN outputs based on one or more relationships between inputs received by the first DNN;
  wherein the system is configured to optimize, based on the DNN outputs, one or more operations of: (i) the first hardware processing unit, (ii) the second processing unit, or (iii) both (i) and (ii) by enhancing performance, efficiency, and/or security of one or more of the computing devices; and
  wherein one or both of the first and second DNNs uses a first set of DNN parameters, and wherein the system is further configured to feed a second set of DNN parameters to one or both of the first and second DNNs, wherein the second set of DNN parameters is based on the DNN outputs.

17. The system of claim 16, wherein the DNN outputs provided by the first DNN are based on one or more predictions corresponding to a future state of: (i) the first hardware processing unit, (ii) the second processing unit, or (iii) both (i) and (ii).

18. The system of claim 16, wherein the DNN outputs include one or more control signals for controlling operation of one or more datapaths of: (i) the first hardware processing unit, (ii) the second processing unit, or (iii) both the first hardware processing unit and the second processing unit.

19. The system of claim 16, wherein the DNN outputs include one or more predictions related to one or both of the first and second processing units, and wherein the system is further configured to adjust a current or voltage supplied to one or both of the first and second processing units based on the one or more predictions.

20. The system of claim 16, wherein the DNN outputs include one or more predictions related to one or both of the first and second processing units, and wherein the system is further configured to provide a warning signal to one or both of the first and second computing devices if one or more unexpected branches, faults, or exceptions in one or both of the first and second processing units is predicted.

21. The system of claim 16, wherein one or both of the first and second DNNs is trained using contrastive divergence (CD), in which: DNN parameters are learned via at least one bottom-up pass followed by at least one top-down pass; in the bottom-up pass, all hidden nodes of a hidden layer of the DNN are sampled in parallel; and in the top-down pass, all visible nodes are sampled in parallel.

22. The system of claim 16, wherein one or both of the first and second DNNs is a generative DNN.

23. The system of claim 16, wherein one or both of the DNNs is implemented using circuitry in one or both of the first and second processing units, respectively.

24. The system of claim 16, wherein the processing unit is a graphics processing unit (GPU), a field-programmable gate array (FPGA), or a digital signal processor (DSP).

25. The system of claim 16, wherein the DNN is a recurrent neural network or a restricted Boltzmann machine.

26. A non-transitory computer-readable medium tangibly comprising computer program instructions, which, when executed by a processor, causes the processor to at least:
  receive one or more inputs corresponding to an operation of one or more computing devices;
  apply one or more deep neural networks (DNNs) to the one or more inputs to generate one or more DNN outputs based on one or more relationships between inputs received, wherein the DNN includes a first set of learned DNN parameters corresponding to processor behavior under one or more computing workloads;
  receiving a second set of one or more DNN parameters to be applied to received inputs; and
  provide the one or more DNN outputs as one or more signals selected from a group consisting of:
  i) control signals for managing one or more operations of one or more of the computing devices;
  ii) predictions for use in generating control signals for managing one or more operations of the computing devices, the predictions corresponding to a future state of one or more of the computing devices;
  iii) warnings indicating that a predicted future state of one or more components of the one or more computing devices deviates more than a threshold deviation level from an acceptable state;
  iv) inputs to one or more DNNs involved in managing operations of the one or more computing devices; and
  v) any combination of i), ii), iii), and iv);
whereby the signals enhance performance, efficiency, and/or security of one or more of the computing devices.

27. A computer-implemented method for managing processing operations of one or more computing devices having one or more processing units, the method comprising:
providing, as inputs to a first set of one or more deep neural networks (DNNs), computing environment data selected from a group consisting of:
  1) sensor data corresponding with operation of one or more of the computing devices,
  2) processing data corresponding with a set of one or more instructions received at one or more of the processing units for execution by the one or more processing units,
  3) DNN data corresponding with DNN outputs from (i) the first set of DNNs, (ii) a second set of one or more DNNs, or (iii) both (i) and (ii), and
  4) any combination of 1), 2), and 3);
receiving a set of one or more DNN outputs from the first set of DNNs, the set of DNN outputs being based on one or more relationships between inputs provided to the first set of DNNs; and
optimizing operations of one or more of the processing units based on the first set of DNN outputs from the first set of DNNs, whereby outputs that affect processor operations using the first set of DNNs enhances performance, efficiency, and/or security of one or more of the computing devices; and
wherein one or both of the first and second DNNs uses a first set of DNN parameters, and wherein the system is further configured to feed a second set of DNN parameters to one or both of the first and second DNNs, wherein the second set of DNN parameters is based on the DNN outputs.

* * * * *